US010929417B2

(12) United States Patent
Greene et al.

(10) Patent No.: US 10,929,417 B2
(45) **Date of Patent: *Feb. 23, 2021**

(54) TRANSFORMING AND LOADING DATA UTILIZING IN-MEMORY PROCESSING

(71) Applicant: International Business Machines Corporation, Armonk, NY (US)

(72) Inventors: Lawrence A. Greene, Plainville, MA (US); Yong Li, Newton, MA (US); Xiaoyan Pu, Chelmsford, MA (US); Yeh-Heng Sheng, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 14/851,061

(22) Filed: Sep. 11, 2015

(65) Prior Publication Data

US 2017/0075964 A1 Mar. 16, 2017

(51) Int. Cl.

*G06F 17/00* (2019.01)
*G06F 7/00* (2006.01)
*G06F 16/25* (2019.01)

(52) U.S. Cl.

CPC .................................. *G06F 16/254* (2019.01)

(58) Field of Classification Search

CPC ................................................. G06F 17/30563

(Continued)

(56) References Cited

U.S. PATENT DOCUMENTS 6,289,385 B1 * 9/2001 Whipple ................... G06F 9/46 709/229
7,908,242 B1 * 3/2011 Achanta ............. G06F 16/2453 707/602

(Continued)

FOREIGN PATENT DOCUMENTS

WO 2013184523 A1 12/2013
WO 2014194251 A2 12/2014

OTHER PUBLICATIONS

Guo et al., A New ETL Approach Based on Data Virtualization, Mar. 2015, Journal of Computer Science and Technology, vol. 30, pp. 311-323 (Year: 2015).*

(Continued)

*Primary Examiner* — Pavan Mamillapalli
(74) *Attorney, Agent, or Firm* — Steven Bouknight; Edell, Shapiro & Finnan, LLC

(57) ABSTRACT

A system includes at least one processor and processes an ETL job. The system analyzes a specification of the ETL job including one or more functional expressions to load data from one or more source data stores, process the data in memory, and store the processed data to one or more target data stores. One or more data flows are produced from the specification based on the one or more functional expressions. The one or more data flows utilize in-memory distributed data sets generated to accommodate parallel processing for loading and processing the data. The one or more data flows are optimized to assign operations to be performed on the one or more source data stores. The optimized data flows are executed to load the data to the one or more target data stores in accordance with the specification. Present invention embodiments further include methods and computer program products.

16 Claims, 10 Drawing Sheets

500
JOB SPEC
505 "sources":[{"tables":[{"name":"CUSTOMER", "columns":[{...}...]}], "id":...}],
510 { "description": "Filter CITY", "columnName": "CITY", "expression": "sql: CITY is not null", "op": "filter-rows",... }
515 { "description": "Filter AGE", "columnName": "AGE", "expression": "sql: AGE > 30", "op": "filter-rows",... }
520 { "description": "Filter STATE", "columnName": "STATE", "expression": "sql: STATE = 'NJ'", "op": "filter-rows",... }
525 "target":{"tables":[{"name":"REPORT"}]}

560
IN-MEMORY JOB MODEL
RDD1 = read(datasource1, "CUSTOMER") 535
RDD2 = transform("SELECT * FROM RDD1 WHERE CITY IS NOT NULL") 540
RDD3 = transform("SELECT * FROM RDD2 WHERE AGE > 30") 545
RDD4 = transform("SELECT * FROM RDD3 WHERE STATE = 'NJ'") 550
write(RDD4, datasource2, "REPORT") 555

(58) Field of Classification Search
USPC .......................................................... 707/602
See application file for complete search history.

(56) References Cited

U.S. PATENT DOCUMENTS 8,200,614 B2 6/2012 Syed et al.
8,286,168 B2 10/2012 Wong et al.
8,447,739 B2 5/2013 Naibo et al.
8,639,652 B2 1/2014 Xu et al.
8,645,276 B2 2/2014 Wong et al.
8,688,625 B1 4/2014 Clark et al.
8,719,769 B2 5/2014 Castellanos et al.
8,903,762 B2 12/2014 Jin et al.
8,972,433 B2 3/2015 McLean et al.
8,996,545 B2 * 3/2015 Chen ....................... G06F 16/29 707/756
9,053,576 B2 6/2015 Baumgartner et al.
9,063,992 B2 6/2015 Bhide et al.
9,411,853 B1 * 8/2016 Dovrtel ................. G06F 16/283
9,426,219 B1 * 8/2016 Keyser ................ H04L 67/1097
9,607,073 B2 * 3/2017 Schechter ............. G06F 16/285
9,619,148 B2 * 4/2017 Bowman ................. G06F 3/067
9,686,086 B1 * 6/2017 Nguyen ............... G06Q 10/101
9,705,751 B1 * 7/2017 Yi ......................... H04L 41/147
9,727,550 B2 * 8/2017 He ...................... G06F 3/04842
9,734,221 B2 * 8/2017 Sarferaz ................ G06F 16/252
9,811,849 B2 * 11/2017 Bursey .................... H04L 67/10
9,832,068 B2 * 11/2017 McSherry ............. G06F 9/4494
9,848,041 B2 12/2017 Einkauf et al.
10,275,234 B2 * 4/2019 Belyy ....................... G06F 8/70
2003/0140170 A1 * 7/2003 Rosensteel, Jr. ........ H04L 29/06 709/246
2004/0236786 A1 * 11/2004 Medicke ................ G06Q 10/00 707/999.104
2007/0106711 A1 * 5/2007 Buros ................... G06F 16/254 707/999.204
2008/0126552 A1 * 5/2008 Berger .................. G06F 9/5038 709/230
2008/0168082 A1 * 7/2008 Jin ........................... G06F 8/20 707/999.102
2008/0172674 A1 * 7/2008 Yee ....................... G06F 9/5038 718/106
2009/0077051 A1 3/2009 Edelstein et al.
2011/0161371 A1 * 6/2011 Thomson ............ G06F 16/2428 707/792
2012/0324387 A1 12/2012 Rausch et al.
2013/0047161 A1 * 2/2013 Simitsis ................ G06F 9/5027 718/100
2013/0275360 A1 * 10/2013 Kharod ................. G06F 16/254 707/602
2013/0297556 A1 * 11/2013 Chen ....................... G06F 16/29 707/602
2014/0082424 A1 3/2014 Sanders
2014/0149590 A1 * 5/2014 Mallipeddi ........... G06F 9/5061 709/226
2014/0359425 A1 12/2014 van der Molen et al.
2014/0359742 A1 12/2014 Bautin et al.
2014/0379892 A1 12/2014 Klimov et al.
2015/0026115 A1 1/2015 Gorelik et al.
2015/0074037 A1 * 3/2015 Sarferaz .................. G06F 16/22 707/602
2015/0074048 A1 * 3/2015 Weisberg ................ G06F 16/27 707/610
2015/0074083 A1 3/2015 Hutzel et al.
2015/0131383 A1 5/2015 Akerib et al.
2015/0134592 A1 5/2015 Verger-Del Bove et al.

OTHER PUBLICATIONS

Bratus, Andrii; "RefineOnSpark: A Simple and Scalable ETL Based on Apache Spark and OpenRefine", University of Trento, Italia, Department of Information Engineering and Computer Science, Master Degree Thesis, Academic Year 2013/2014, pp. 1-112.
Dessloch et al.; "Orchid: Integrating Schema Mapping and ETL", Data Engineering, ICDE 2008, IEEE 24th International Conference on, Apr. 7-12, 2008, pp. 1307-1316.
Gopalani et al.; "Comparing Apache Spark and Map Reduce With Performance Analysis Using K-Means", International Journal of Computer Applications (0975-8887), vol. 113, No. 1, Mar. 2015, pp. 8-11.
Zaharia et el.; "Spark: Cluster-Computing with Working Sets",Electrical Engineering and Computer Sciences, University of California at Berkeley, Jun. 2010, pp. 1-7.
"Quick Start", https://spark.apache.org/docs/latest/quick-start.html, retrieved from the Internet Aug. 17, 2015, pp. 1-5.
List of IBM Patents or Patent Applications Treated as Related, Aug. 3, 2016.

* cited by examiner

TRANSFORMING AND LOADING DATA UTILIZING IN-MEMORY PROCESSING

BACKGROUND

Present invention embodiments relate to data migration, and more specifically, to performing extract, transform, load (ETL) jobs to transfer data between source and target systems utilizing in-memory processing of the data.

In an extract, transform, load (ETL) job model, intermediate data rows are sent from one processing stage (or source data store) to the next processing stage (or target data store) through inter-process and/or network communication channels. When the processing stages are executed on the same machine, shared memory is used for local connections. In particular, two shared memory buffers are allocated between two processes. A producing stage fills one buffer, and a corresponding consuming stage starts reading from that buffer while the producing stage starts outputting records to the second buffer. Once the second buffer is full and the consuming stage has finished reading input records from the first buffer, the consuming stage starts reading records from the second buffer and the producing stage starts to output new records to the first buffer. This interaction continues until all records have been processed.

When the producing stage and the consuming stage are executed on two different machines, the producing stage maintains an output record buffer and the consuming stage maintains an input record buffer. Data is transported over a network from the producing stage output buffer to the consuming stage input buffer. This approach requires that at least two record buffers be created for each communication channel before any data can be processed. The number of required buffers increases with the number of stages in a job flow and the number of partitions to which the job flow is applied.

An extract, transform, load (ETL) job includes multiple job flows, where each job flow receives input data from one or more source data stores, processes the input data, and writes the processed data to a target data store. In a traditional approach, job flows are executed by a centralized extract, transform, load (ETL) server. Input data is sent to the ETL server for processing, and the processed data is sent to a target data store. As data flows through various channels, the data is replicated to fulfill parallel processing requirements.

For example, a job flow may move data from a source to three different targets and include source, copy, and target stages. A two-way parallel execution needs 24 shared memory buffers between the copy stage and the consuming target stages. This example employing a default 128 Kilobit shared memory buffer size requires about 3 Megabits of memory to be allocated just to replicate data for further processing by three downstream stages individually.

Traditional ETL job modeling has several disadvantages. For example, this approach incurs processor (central processing unit (CPU)) and memory cost associated with data replication. Further, the incomparable speeds of producing and consuming buffers creates bottlenecks. In order to avoid these bottlenecks, data may be stored on disk before moving to the record buffers, thereby introducing latency to the parallel processing. In addition, there is a lack of fault tolerance. If any communication channel fails, the entire job flow aborts and needs to be re-started.

SUMMARY

According to one embodiment of the present invention, a system processes an Extract, Transform, Load (ETL) job. The system comprises at least one processor, and analyzes a specification of the ETL job including one or more functional expressions to load data from one or more source data stores, process the data in memory, and store the processed data to one or more target data stores. The system produces one or more data flows from the specification based on the one or more functional expressions. The one or more data flows utilize in-memory distributed data sets generated to accommodate parallel processing for loading and processing the data. The one or more data flows are optimized to assign operations to be performed on the one or more source data stores. The optimized data flows are executed to load the data to the one or more target data stores in accordance with the specification.

In a further embodiment, the system may store results of one or more designated operations on an in-memory distributed data set of a data flow, and re-start the ETL job from a previously executed designated operation based on corresponding stored results. This enables the ETL job to re-start from an intermediate location and avoid completely re-starting in response to an event.

In another embodiment, the system may re-use the stored results of a designated operation in response to a subsequent execution of that operation. This avoids the need to repeat operations and enhances processing.

In still another embodiment the optimized data flows are compatible with an APACHE SPARK computing environment, and the in-memory distributed data sets include Resilient Distributed Datasets. The APACHE SPARK computing environment provides parallel processing and in-memory computations to enhance processing speed for the job.

Embodiments of the present invention may further include methods and computer program products for processing an Extract, Transform, Load (ETL) job in substantially the same manners described above.

Present invention embodiments employ a job model to provide flow execution (e.g., in the form of distributed dataset computations) to data nodes where the data resides, thereby preventing unnecessary data replication. This avoids unnecessarily storing data to disk, reduces the memory footprint and processor (e.g., central processing unit (CPU)) consumption, and improves processing efficiency. The distributed data sets (e.g., SPARK Resilient Distributed Datasets (RDD)) can be rebuilt individually, thereby eliminating the need to re-start the entire job execution when any dataset processing error occurs. Moreover, special transformation function characteristics and systematic job optimization provided by present invention embodiments greatly reduce job execution time and consumption of memory and temporary disk space. In addition, present invention embodiments improve efficiency and robustness of parallel data processing with less computation cost (e.g., memory, CPU, disk, etc.).

BRIEF DESCRIPTION OF THE DRAWINGS

Generally, like reference numerals in the various figures are utilized to designate like components.

DETAILED DESCRIPTION

Figure 1:
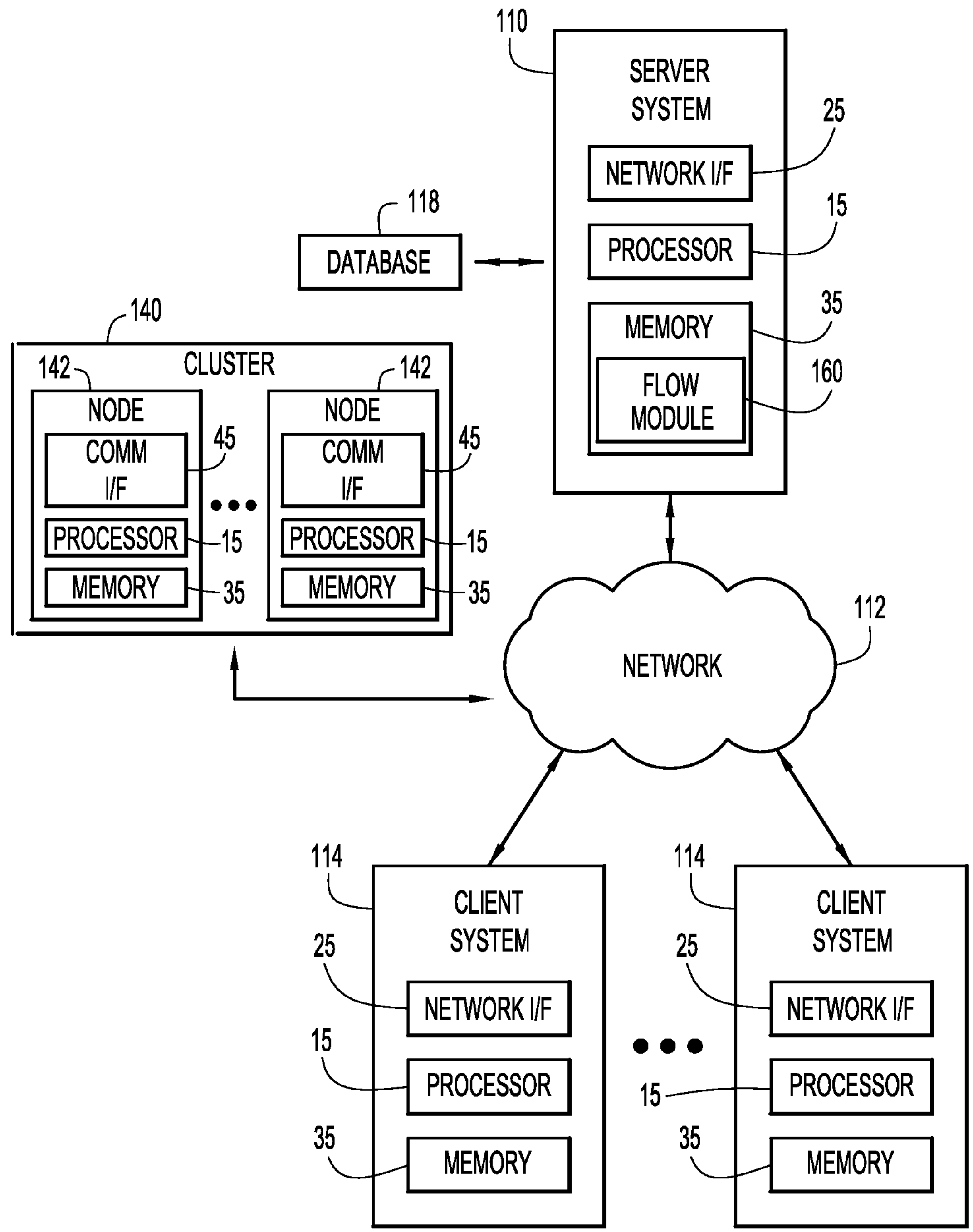
FIG. 1 is an example computing environment for use with an embodiment of the present invention.

Present invention embodiments transform a traditional extract, transform, load (ETL) job model into an in-memory computational job model. The in-memory computational job modeling is built on top of a computing environment performing data processing through in-memory computations on distributed datasets. The computing environment is preferably implemented by an APACHE SPARK computing environment. An embodiment utilizing the APACHE SPARK computing environment provides parallel processing and in-memory computations to enhance processing speed for the job.

In this type of environment, data processing is performed through in-memory computations on distributed datasets (e.g., Resilient Distributed Datasets (RDDs)). The distributed datasets provide a distributed memory abstraction on a distributed dataset in a fault-tolerant manner. These distributed datasets enable data in between computations to be re-used in memory without first being written to external storage systems, thereby eliminating substantial overheads due to data replication, disk input/output (I/O), and object serialization.

Special characteristics and their associated behaviors are added to the in-memory computational model to re-use cached input data and the result of in-memory computations in order to greatly reduce the total job execution time and overall resource consumption.

In order to utilize advantages of the in-memory computations, present invention embodiments transform an extract, transform, load (ETL) job into the in-memory computational model (e.g., SPARK and Resilient Distributed Data Sets (RDD)). Present invention embodiments accommodate properly saving and re-using completed computations in a job re-start in case of job execution failures, and handle reject link processing efficiently. Further, present invention embodiments generate efficient programs (e.g., SPARK programs) that maximize distributed dataset (e.g., RDD) reuse, and perform intelligent job optimization to reduce processor (e.g., central processing unit (CPU)) and memory consumption.

In a traditional extract, transform, load (ETL) job execution model, data is sent to a job execution server that performs the flow execution. In contrast, the job model of present invention embodiments provides flow execution (e.g., in the form of distributed dataset computations) to data nodes where the data resides, thereby preventing unnecessary data replication. This avoids unnecessarily storing data to disk, reduces the memory footprint and processor (e.g., central processing unit (CPU)) consumption, and improves processing efficiency. The distributed datasets (e.g., SPARK Resilient Distributed Datasets (RDD)) can be rebuilt individually, thereby eliminating the need to re-start the entire job execution when any dataset processing error occurs. Moreover, special transformation function characteristics and systematic job optimization provided by present invention embodiments greatly reduce job execution time and consumption of memory and temporary disk space. In addition, present invention embodiments improve efficiency and robustness of parallel data processing with less computation cost (e.g., memory, CPU, disk, etc.).

An example computing environment for use with present invention embodiments is illustrated in FIG. 1. Specifically, the computing environment includes one or more server systems 110, one or more client or end-user systems 114, and a cluster 140 of computing nodes 142. Server systems 110, client systems 114, and cluster 140 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and cluster 140 may be local to each other, and communicate via any appropriate local communication medium (e.g., local area network (LAN), hardwire, wireless link, Intranet, etc.).

Client systems 114 enable users to submit job specifications and other information to server systems 110 to transform the job specifications to in-memory computational models for execution by cluster 140. The server systems include a flow module 160 to transform the job specification to programs or other modules of the in-memory computational model for execution by cluster 140. A database system 118 may store various information for the transformation. The database system may be implemented by any conventional or other database or storage unit, may be local to or remote from server systems 110, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the job specifications and desired transformations, and may provide reports (e.g., transformed program or module, in-memory model, results of transformations, etc.).

Server systems 110 and client systems 114 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, flow module, browser/interface software, etc.).

Cluster 140 includes a plurality of computing nodes 142 in communication with each other to perform parallel processing and in-memory computations to process data. Cluster 140 receives a resulting program or module employing an in-memory computational model from server system 110 for execution as described below. By way of example, cluster 140 is preferably implemented by an APACHE SPARK computing environment, but any processing framework performing in-memory computations (e.g., parallel processing framework employing distributed datasets) may be utilized. Computing nodes 142 of cluster 140 may be implemented by any conventional or other computer systems preferably equipped with a display or monitor, a base (e.g., including at least one processor 15, one or more memories 35 and/or communication interfaces or devices 45 (e.g., modem, network cards, etc.)), optional input devices (e.g., a keyboard, mouse or other input device), and any commercially available and custom software (e.g., communications software, computational software, etc.).

Flow module 160 may include one or more modules or units to perform the various functions of present invention embodiments described below. The various modules (e.g., flow module, etc.) may be implemented by any combination of any quantity of software and/or hardware modules or units, and may reside within memory 35 of the server and/or client systems for execution by processor 15.

Figure 2:
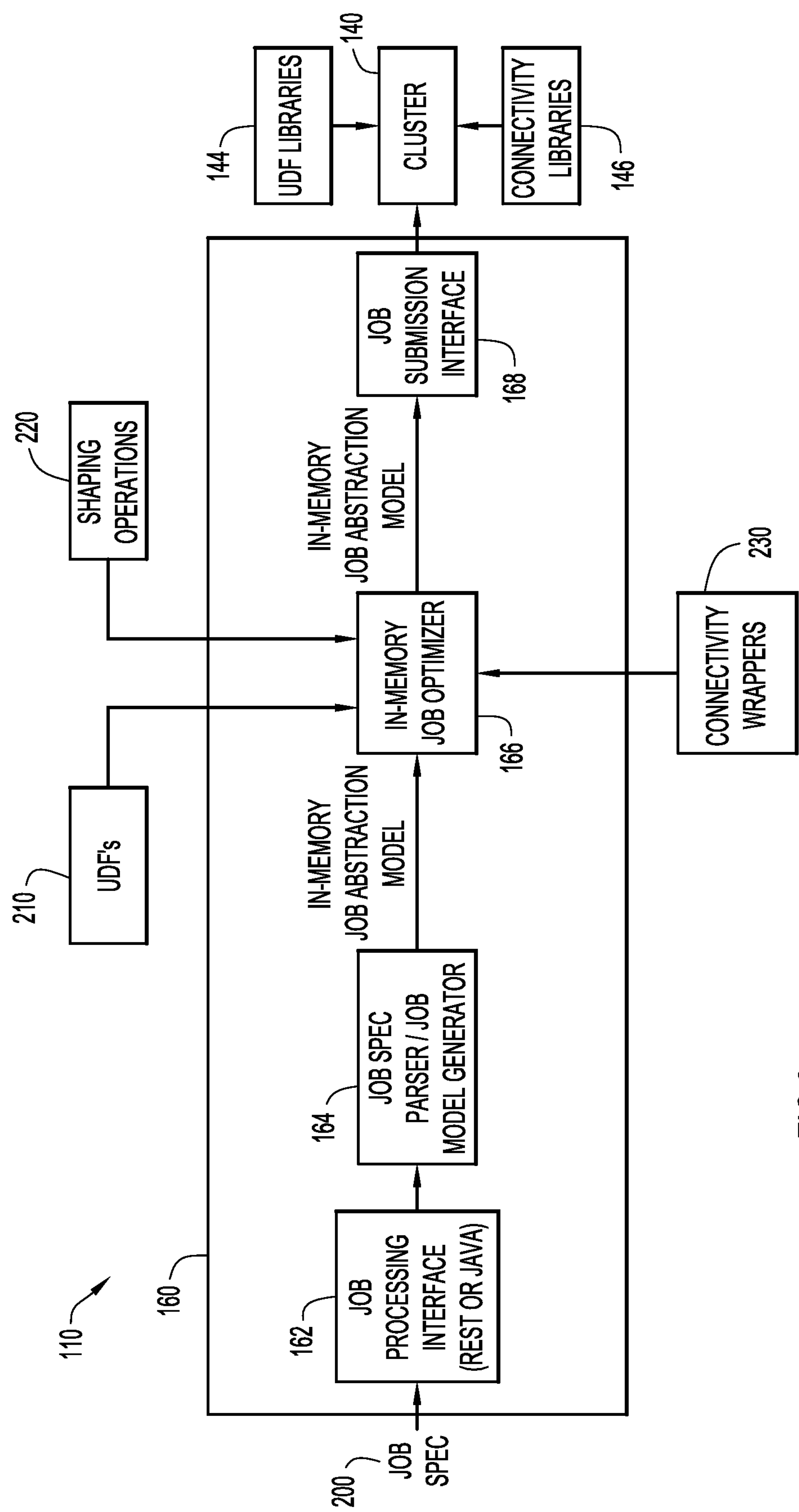
FIG. 2 is a block diagram of a server computer system of the computing environment of FIG. 1 according to an embodiment of the present invention.

Referring to FIG. 2, flow module 160 of server system 110 includes a job processing interface 162, a parser and model generator 164, a job optimizer 166, and a job submission interface 168. An extract, transform, load (ETL) or other job is represented in a job specification 200. By way of example, the job specification may be a Java Script Object Notation (JSON) specification. However, the job may be specified in any notation, format and/or language. Job specification 200 is received by job processing interface 162 that provides the job specification to parser and model generator 164. The job processing interface is preferably a Representational State Transfer (REST) or JAVA type interface, but any interface or protocol may be utilized. Job processing interface 162 may be bypassed in cases where the job specification may be directly processed by parser and model generator 164.

The parser and model generator parses and analyzes job specification 200 as described below to produce an initial program or module for execution by cluster 140 employing an in-memory computational model. Job optimizer 166 processes the initial module to optimize the module (e.g., push operations to the sources, consolidate statements, etc.) as described below. The job optimizer may employ user defined functions (UDF) library 210 (e.g., user defined SPARK functions), shaping or transformation operations 220, and connectivity wrappers 230 (e.g., providing data source connectors (e.g., JAVA interface to libraries)) to perform the optimization (and generation of a job execution module). The user defined functions, shaping operations, and connectivity wrappers may be stored within database 118.

The resulting optimized module is converted to a job execution model or module by job optimizer 166 and provided to job submission interface 168 that submits the job execution module to cluster 140 (e.g., SPARK computing environment) for execution based on the in-memory computational model (e.g., parallel processing and in-memory operations). The job submission interface is preferably a Representational State Transfer (REST) or JAVA type interface, but any interface or protocol may be utilized. Cluster 140 may include and employ user defined function (UDF) libraries 144 (e.g., providing user defined functions (e.g., SPARK functions) for the cluster) and connectivity libraries 146 (e.g., providing data source connectors) to execute the job execution module. The flow module (e.g., via the job processing and submission interfaces) may poll cluster 140, and retrieve results in response to completion of the module execution.

Present invention embodiments transform a traditional extract, transform, load (ETL) job model into an in-memory computational job model. Each stage of the in-memory computational job model may be represented by a transformation function, and a sequence of the stages may be represented by a functional expression including a series of transformation function compositions. A job is represented as a set of functional expressions, each representing a flow. Each transformation function may be associated with certain characteristics, and may be tagged as a checkpoint (e.g., for failure re-start) or persistent (e.g., for sharing computations) as described below. These characteristics and tags facilitate job optimization as described below. Cluster (e.g., SPARK) programs or modules are generated from the optimized functional expressions, and subsequently executed to produce the expected results.

Figure 3:
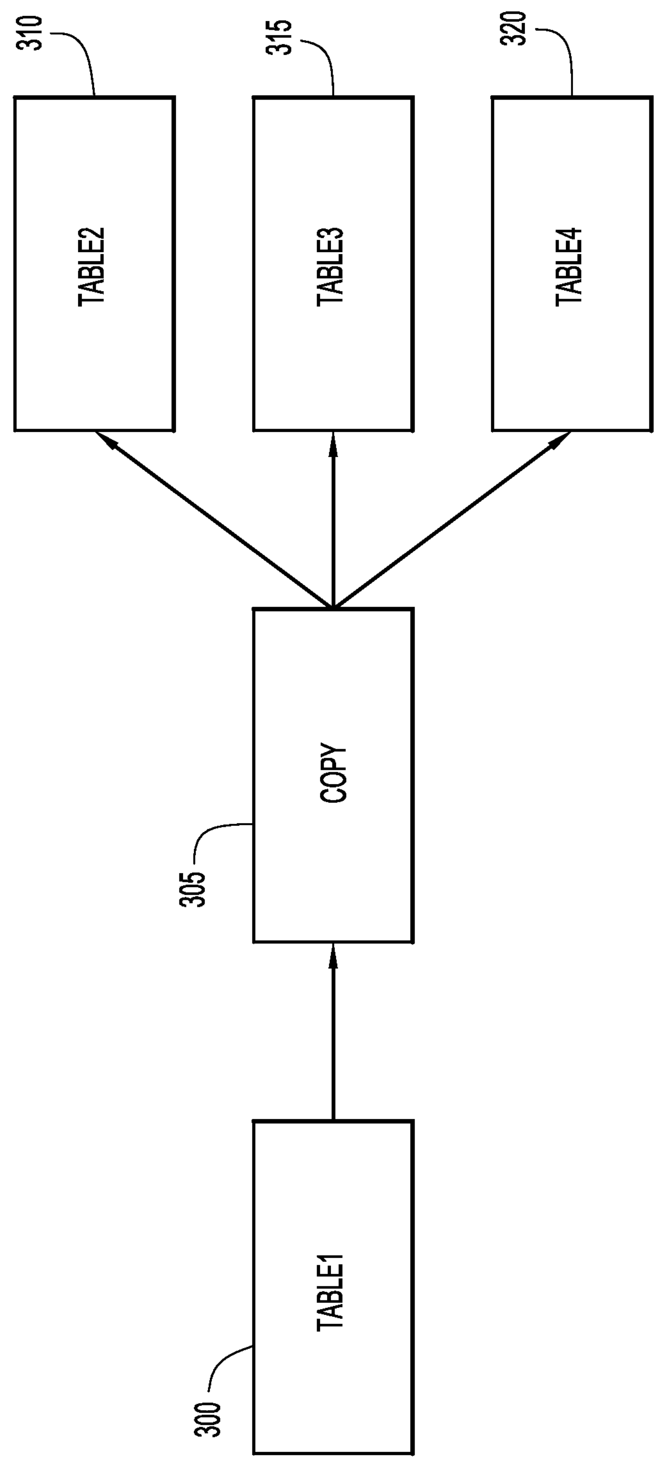
FIG. 3 is a diagrammatic illustration of an example job flow.

A job is naturally divided into job flows with each represented by a series of function compositions as described above. For example, a job flow may be expressed as "f1(f2(f3(DataSource1), f4(DataSource2)))", where function "f1" corresponds to a target stage and inner non-function arguments (e.g., "DataSource1" and "DataSource2") represent input source data. Referring to FIG. 3, an example extract, transform, load (ETL) job may apply a copy operation or stage 305 to copy data from a first table or source stage 300 (e.g., TABLE1) to tables or output stages 310, 315, and 320 (e.g., TABLE 2, TABLE 3, and TABLE4). This job may be represented as the following functional expression: "write(copy(read(DataSource)), DataTarget1)", "write(copy(read(DataSource)), DataTarget2)", and "write (copy(read(DataSource)), DataTarget3)", where each function (e.g., write, copy, and read) is considered a transformation function. Each "read" function reads data from a particular source data store (e.g., a database table, a HADOOP file, etc.), while a "write" function writes the processed data to a particular target data store. A job flow expression for a write function may be defined as follows:

write(arg 1,arg 2, . . . ,argN)

where "write" is a transformation function that writes the processed data produced as the result of argument "arg1" to one or more target data stores specified as arguments "arg2 . . . argN". The first argument, "arg1", may be any transformation function (except the "write" function). Other functions are defined in a similar manner.

An example job specification (in a JAVA Script Object Notation (JSON) format) for the above job flow of FIG. 3 may be expressed as:

```
"sources":[{"tables":[
        {"name":"TABLE1",
        "columns":[{...}...]}],
        "id":...}
      ]
    }
  ]
"target":{"tables":[
    {"name":"TABLE2"},
    {"name":"TABLE3"},
      {"name":"TABLE4"}
  ]
}
```

Parser and model generator 164 parses and analyzes this example job specification to produce an initial program or module employing an in-memory computational model. Job optimizer 166 processes the initial module to optimize the module (e.g., push operations to the sources, consolidate statements, etc.) and produce a job execution module for submission to cluster 140 (e.g., SPARK computing environment) for execution based on the in-memory computational model (e.g., parallel processing and in-memory operations).

During job compilation, a job is decomposed into one or more flows. The job (e.g., Java Script Object Notation (JSON) specification) is parsed and objects are created (e.g., source and target tables, connections and options, shaping pipelines, etc.) for the in-memory computational model. Flows are created based on source to target mappings and shaping pipelines, where each flow contains one or more target stages and is preferably executed in one thread. Each job may have one or more flows that may share one or more source tables. Each shared table is loaded only once, and persisted in memory and disk for maximal re-use. A flow includes a shaping pipeline, one or more sources, and one or more targets.

Each created flow is optimized. This may include pushing distributed dataset computations to source data stores. This controls the memory footprint by eliminating unnecessary data rows flowing from source data stores. The criteria may include source data store processing speed, network capacity, and available main memory in the cluster computing nodes. Re-ordering operations may assist pushing shared stages into source data stores (e.g., unless the end result is to execute the re-ordered operations in memory).

A reject flow may be incorporated (prior to optimization) for saving rejected records. An additional status column is added that indicates a status (e.g., keep or reject) of a particular row. An intermediate distributed dataset maintains all rows expanded with this additional status column. In this case, a main flow and the reject flow may span in different directions. For example, a filter stage of a main flow may generate the correct distributed dataset with all kept rows, while another filter stage may generate the rejected distributed dataset with all the rejected rows. The job flows share the intermediate distributed dataset as the source dataset, where the intermediate distributed dataset is only collected once.

In addition, checkpoints may be incorporated into the flows. Sampling and/or statistics may be utilized to identify frequent occurrences of intermediate data re-use. Checkpoints are inserted at the identified places to save intermediate distributed datasets at the checkpoints in database tables to be used when a job re-starts. Only the last completed distributed datasets in each execution path need to be saved. When a failed job re-starts, the job checks for the presence of previously saved distributed datasets in the database that represent the completed computations before the prior job execution failure. If these distributed datasets exist, the re-started job execution invokes a function (e.g., 'RestoreRDD( )') that re-creates each saved distributed dataset and continues remaining job execution.

By way of example, a job specification in a JAVA Script Object Notation (JSON) may be expressed as follows:

```
"sources":[{"tables":[{"id":"src1.tab","name":"SRCTGT012A",
"columns":[{...}...]}]...}]
"target":{"tables":[{"name":"SRCTGT013A"},
                    { "name":"SRCTGT013B","sourceIds":["src1.tab"]}
                    { "name":"SRCTGT013C","sourceIds":["src1.tab"]}]
```

The example flow moves data from source table SRCTGT012A to target tables SRCTGT013A, SRCTGT013B, and SRCTGT013C. Present invention embodiments may produce the following flows:

A - source table SRCTGT012A => target table SRCTGT013A
B - source table SRCTGT012A => target table SRCTGT013B
C - source table SRCTGT012A => target table SRCTGT013C The resulting flows are run concurrently on cluster 140. Flow A may load source table SRCTGT012A, while flows B and C wait until source table SRCTGT012A is fully loaded. The resulting flows read data from a distributed dataset (e.g., SPARK Resilient Distributed Dataset (RDD)) generated for source table SRCTGT012A concurrently, while each flow writes data rows to the corresponding target table (e.g., target tables SRCTGT013A, SRCTGT013B, and SRCTGT013C).

Figure 4:
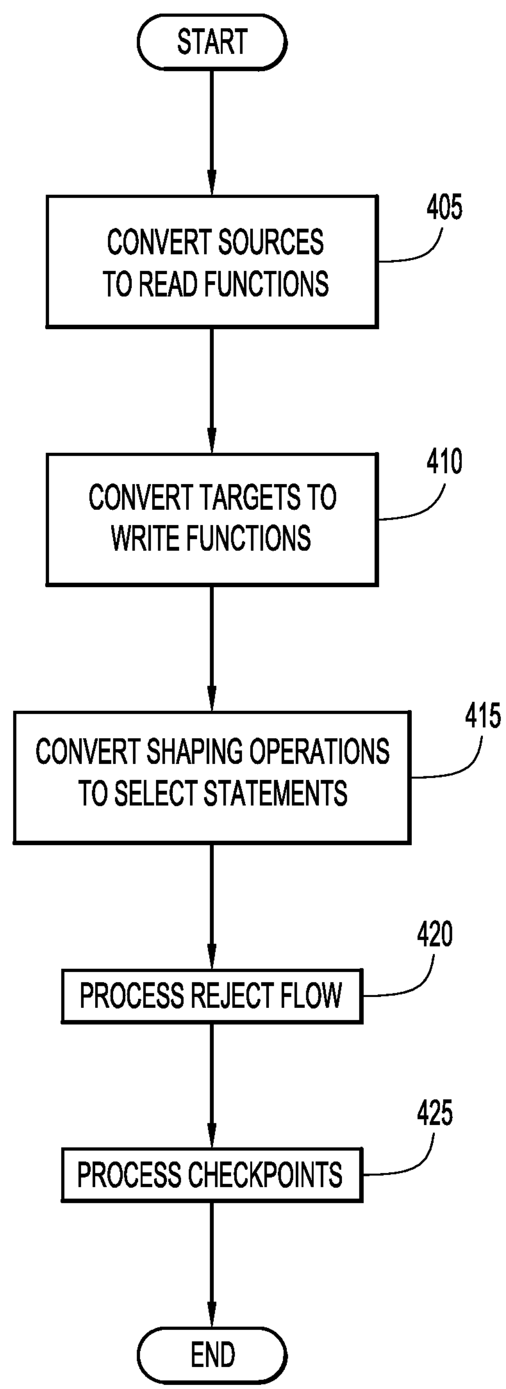
FIG. 4 is a procedural flowchart illustrating a manner of processing a job flow to produce an in-memory job model according to an embodiment of the present invention.

A manner of parsing a job specification and generating an initial module based on an in-memory computational model (e.g., via server system 110 and flow module 160) according to an embodiment of the present invention is illustrated in FIG. 4. Initially, a job specification (e.g., JAVA Script Object Notation (JSON), etc.) or file is converted to an in-memory job computational representation that includes a set of stages. Each stage includes one or more input links and/or one or more output links. An input link of a stage provides input rows of data, while an output link delivers processed rows from a stage to one or more successive stage connected by the corresponding output link. A stage with input and output links may be viewed as a function that takes rows provided by the input links of the stage as an input argument, and produces rows on the output link of the stage. A stage that has only output links (but not input links) is a read stage or a read function, while a stage that has only input links (but not output links) is a write stage or a write function.

Each stage or function in the generated job model is associated with a target distributed dataset (e.g., SPARK Resilient Distributed Dataset (RDD)) variable. The output of a function is basically assigned to the target distributed dataset variable. When a target distributed dataset variable is referenced in a subsequent function, the assigned data is used as an argument to the respective function.

In particular, parser and model generator 164 of flow module 160 parses and analyzes a job specification to produce an initial program or module for execution by cluster 140 employing an in-memory computational model. The source tables within the job specification are identified based on identifiers (e.g., names, identifiers, sections or tags (e.g. "sources" field of a JSON job specification), etc.) and converted to one or more read or data retrieval functions at step 405. For each identified source table (e.g., table element in the "tables" array in the "sources" field of the JSON file), a read function is generated. The generated read function, by way of example, includes arguments comprising an object representation of the source data source, and a specified table name (e.g., from the table element).

The target tables within the job specification are identified based on identifiers (e.g., names, identifiers, sections or tags (e.g., "target" field of a JSON job specification), etc.) and converted to one or more write or data storage functions at step 410. For each identified target table (e.g., table element in the "tables" array in the "target" field of the JSON file), a write function is generated. The generated write function, by way of example, includes arguments comprising a distributed dataset (e.g., SPARK Resilient Distributed Dataset (RDD)) variable name, a target data source object, and a specified table name (e.g., from the table element).

Shaping or transformation operations (e.g., filter operation, column rename operation, column removal operation, sort operation, sort-and-remove-duplicates operation, join operation, lookup operation, transform operation, fill operation, suppress operations (e.g., blanks, nulls, etc.), mask data operation, column metric operation, standardize operation, calculate-column-value operation, etc.) within the job specification are each identified based on identifiers (e.g., operation names, identifiers, sections or tags, etc.) and mapped or converted to a corresponding operational (e.g., SELECT) statement at step 415. Information for generating the operational statement may be ascertained from corresponding portions within the transformation operations of the job specification and/or from information pertaining to the system (e.g., distributed datasets, schemas, etc.). For example, a filter operation may be converted to the statement "SELECT <column-list> FROM <DD> WHERE <sql-expression>", where <DD> refers to the distributed dataset variable from the previous operation, <column-list> is a list of all the columns in the schema of the distributed dataset of variable DD, and <sql-expression> is extracted from the expression field of the filter operation. By way of example, the statement "SELECT name, age, salary FROM DD2 WHERE age >30" may be produced from the following filter operation in a job specification.

```
{ "description": "Filter age",
"columnName": "age",
"expression": "sql: age > 30",
"op": "filter-rows",... }
```

A column rename operation may be converted to the statement "SELECT <renamed-columns> FROM <DD>", where <DD> refers to the distributed dataset variable from the previous operation. For example, the following statement "SELECT name, age, income FROM DD1", where the schema for the distributed dataset variable DD1 contains columns name, age, and salary, may be produced from the following column rename operation in a job specification.

```
"operation": {
        "op":"column-rename",
        "description":"Rename the old column name to the new
column name",
        "oldColumnName":"SALARY",
        "newColumnName":"INCOME",
        "version":"2.6"
    }
```

The resulting SELECT statement renames the salary column in distributed dataset DD1 to an income column in a second distributed dataset (e.g., DD2) receiving the results of the column rename operation.

A column removal operation in the job specification may be converted to the statement "SELECT <remaining-columns> FROM <DD>", where <DD> refers to the distributed dataset variable from the previous operation. For example, the statement "SELECT name, age FROM DD3", where the schema for the distributed dataset of variable DD3 contains columns name, age, and salary, may be produced from the following column removal operation in a job specification.

```
"operation":{
        "op":"column-removal",
        "description":"Remove the named column",
        "columnName":"SALARY",
        "version":"2.6"
    }
```

The resulting SELECT statement removes the salary column of the distributed dataset of variable DD3 from a second distributed dataset (e.g., DD4) receiving the results of the column removal operation.

A sort operation in the job specification may be converted to the statement "SELECT <columns> FROM <DD> ORDER BY <sort-columns>", where <DD> refers to the distributed dataset variable from the previous operation. For example, the statement "SELECT name, age, salary FROM DD3 ORDER BY name", where the schema of the distributed data set of variable DD3 contains columns name, age, and salary, may be produced from the following sort operation in a job specification.

```
"operation": {
    "op": "row-reorder",
    "description": "Row reorder using column LAST_NAME",
    "mode": "row-based",
    "sorting": {
    "criteria": [{
    "caseSensitive": false,
      "column": "name",
      "reverse": false,
    "valueType": "string" }]},
    "version": "2.6"
}
```

The resulting SELECT statement sorts the data of the distributed dataset of variable DD by last name.

A sort-and-remove-duplicates operation of the job specification may be converted to the statement "SELECT <column-list> FROM <DD>", where <DD> refers to the distributed dataset variable from the previous operation, and <column-list> is a list of all the columns in the schema of the distributed dataset of variable DD with the remove-duplicate column together with key columns replaced by a special user defined function (UDF) (e.g., removeDuplicates( )). For example, the statement "SELECT employeeId, removeDuplicates(department, employeeId) FROM DD2", where "department" is the remove-duplicate column and "employeeId" is the key column, may be produced from the following sort-and-remove-duplicates operation in a job specification.

```
"operation":{
    "op":"sort-and-remove-duplicates",
    "description":"Remove duplicates",
    " criteria ": {
        "columnName": "department",
        "caseSensitive": false,
        "valueType":"STRING"
            },
    "version":"2.6"
    }
```

The resulting SELECT statement sorts the data of the distributed dataset by department while removing duplicates.

A join operation of the job specification may be converted to the statement "SELECT <columns> FROM <join-expr", where <join-expr> is a join expression constructed based on field properties specified in the join operation. For example, the statement "SELECT t1.ID, t1.AGE, t2.ANOTHER_ID, t2.NAME FROM DD1 as t1 INNER JOIN DD2 as t2 ON t1.ID=t2.ANOTHER_ID", where the schema of the distributed dataset of variable DD1 contains columns ID and AGE, and the schema of the distributed dataset of variable DD2 contains columns ANOTHER_ID and NAME, may be produced from the following join operation in a job specification.

```
"operation":{
    "originalJoinOperation":{
    "includeUniqueInParent":false,
    "includeUniqueInChild":false,
    "op":"join-datasets",
   "criteria":[
        {"childColumnName":{
        "name":"ANOTHER_ID"},
        "parentColumnName":{
        "name":"ID" },
        "caseSensitive":false}
  ],
    "childDataset":"source1.table2",
    "version":"2.6"
}
```

The result of the SELECT statement is a join operation. If the “includeUniqueInParent” parameter is set to true, while the “includeUniqueInChild” parameter is set to false, the inner join becomes a left outer join. Inversely, a right join is performed when the “includeUniqueInParent” parameter is set to false, while the “includeUniqueInChild” parameter is set to true. A full outer join is performed when both of these parameters are set to true.

A lookup operation of the job specification may be converted to the statement “SELECT <columns> FROM <join-expr>”, where <join-expr> is a join expression constructed based on field properties specified in the lookup operation. A lookup operation is similar to a join operation. For example, the statement “SELECT t1.ID, t1.AGE, t2.ANOTHER_ID, t2.NAME FROM DD1 as t1 LEFT OUTER JOIN DD2 as t2 ON t1.ID=t2.ANOTHER_ID”, where the schema of the distributed dataset of variable DD1 contains columns ID and AGE, and the schema of the distributed dataset of variable DD2 contains columns ANOTHER_ID and NAME, may be produced from the following lookup operation in a job specification.

```
"operation":{
    "originalJoinOperation":{
    "op":"lookup-datasets",
    "criteria":[
    {"childColumnName":{
        "name":"ANOTHER_ID"},
        "parentColumnName":{
        "name":"ID" },
        "caseSensitive":false}
    ],
    "childDataset":"source1.table2",
    "version":"2.6"
  },
```

The resulting SELECT statement performs a lookup operation similar to the join operation described above, except that the “includeUniqueInParent” parameter is always true, and the “includeUniqueInChild” parameter is always false.

A transform operation of the job specification may be converted to the statement “SELECT <column-list> FROM <DD>”, where <DD> refers to the distributed data set variable from the previous operation, and <column-list> is a list of all the columns in the schema of the distributed dataset of variable DD with the transform column replaced by an invocation of a user defined function (UDF) to process the column. For example, the statement “SELECT ORDER_ID, AGE(ORDER_DATE, 1, 2, 3) FROM DD1”, where AGE( ) is a user defined function (UDF), may be produced from the following transform operation in a job specification.

```
“operation”: {
“columnName”: “ORDER_DATE”,
“description”: “Age order date”,
“sqlExpression”: “sql:AGE(ORDER_DATE, 1, 2, 3)”,
“op”: “text-transform”,
  “version”: “2.6”,
  ...
}
```

The resulting SELECT statement produces a text version of an age of an order within the distributed dataset.

A fill-down operation of the job specification may be converted to the statement “SELECT <column-list> FROM <DD>”, where <DD> refers to the distributed dataset variable from the previous operation, and <column-list> is a list of all the columns in the schema of the distributed dataset of variable DD with the fill-down column replaced by a special user defined function (UDF) for providing fill values (e.g., fillDown( )). For example, the statement “SELECT employeeId, employeeName, fillDown(department) FROM DD2”, may be produced from the following fill-down operation in a job specification.

```
“operation”: {
    “description”: “Fill-down department”,
    “columnName”: “department”,
    “op”: “core/fill-down”,...
}
```

The resulting SELECT statement fills the specified column of the distributed dataset with data from the user defined function (UDF).

A suppress-blanks operation of the job specification may be converted to the statement “SELECT <column-list> FROM <DD> WHERE <column> IS NOT NULL AND trim(<suppress-column>) !=‘ ’”, where <DD> refers to the distributed dataset variable from the previous operation, and <column-list> is a list of all the columns in the schema of the distributed dataset of variable DD. For example, the statement “SELECT employeeId, employeeName, department FROM DD2 WHERE department IS NOT NULL AND trim(department) !=‘ ’” may be produced from the following suppress-blanks operation in a job specification.

```
“operation”: {
    “description”: “Suppress-blanks department”,
    “columnName”: “department”,
    “op”: “suppress-blanks”,...
}
```

The resulting SELECT statement suppresses blanks in the resulting data retrieved from the distributed dataset.

A suppress-nulls operation of the job specification may be converted to the statement “SELECT <column-list> FROM <DD> WHERE <column> IS NOT NULL”, where <DD> refers to the distributed dataset variable from the previous operation, and <column-list> is a list of all the columns in the schema of the distributed dataset of variable DD. For example, the statement “SELECT employeeId, employeeName, department FROM DD2 WHERE department IS NOT NULL” may be produced from the following suppress-nulls operation in a job specification.

```
"operation": {
    "description": "Suppress-nulls department",
    "columnName": "department",
    "op": "suppress-nulls",...
}
```

The resulting SELECT statement suppresses nulls in the resulting data retrieved from the distributed dataset.

A mask-data operation of the job specification may be converted to the statement "SELECT <column-list> FROM <DD>", where <DD> refers to the distributed dataset variable from the previous operation, and <column-list> is a list of all the columns in the schema of the distributed dataset of variable DD with the mask-data column replaced by a special user defined function (UDF) for masking data (e.g., maskData( )). For example, the statement "SELECT employeeId, maskData(email, "Emails", "EmailCaseResult=UPPER", "usernameprefix=mruser") FROM DD2" may be produced from the following mask-data operation in a job specification.

```
"operation": {
"op":"mask-data",
"description":"dummy",
"policy":"Emails",
"options":{
"FIELD":"email",
"EmailCaseResult":"UPPER",
"usernameprefix":"mruser"
},
"version":"2.6"
}
```

The resulting SELECT statement masks data retrieved from the distributed dataset.

A column-metric operation of the job specification may be converted to the statement "SELECT <column-list> FROM <DD", where <DD> refers to the distributed dataset variable from the previous operation, and <column-list> is a list of all the columns in the schema of the distributed dataset of variable DD. For example, the statement "SELECT STATE FROM DD2" may be produced from the following column-metric operation in a job specification.

```
{
"columnName": "STATE",
"description": "Value metric of STATE",
"expression": "",
"op": "column-metric",
"version": "2.6" }
```

The resulting SELECT statement performs the metric operation (or expression indicated in the job description) on the specified column in the distributed dataset. In this example, since the expression is null, data is simply retrieved from the column in the distributed dataset.

A standardize operation of the job specification may be converted to the statement "SELECT <column-list> FROM <DD>", where <DD> refers to the distributed dataset variable from the previous operation, and <column-list> is a list of all the columns in the schema of the distributed dataset of variable DD with the standardize columns replaced by a special user defined function (UDF) for standardizing data (e.g., standardize( )). For example, the statement "SELECT employeeId, standardize("FirstName,LastName", "USNAME") FROM DD2" may be produced from the following standardize operation in a job specification.

```
"operation": {
    "op":"standardize",
    "description":"Standardization",
    "columnNames":"FirstName,LastName",
    "ruleset":"USNAME",
    "version":"2.6"
  }
```

The resulting SELECT statement standardizes the first and last names from the distributed dataset according to the specified ruleset.

A calculate-column-value operation of the job specification may be converted to the statement "SELECT <column-list> FROM <DD>", where <DD> refers to the distributed dataset variable from the previous operation, and <column-list> is a list of all the columns in the schema of the distributed dataset of variable DD with the target column replaced by a user defined function (UDF) or arithmetic operation. For example, the statement "SELECT employeeId, employeeName, CONCAT(department, '001') FROM DD2" may be produced from the following calculate-column-value operation in a job specification.

```
"operation": {
    "op": "calculate-column-value",
    "columnName": "department",
    "version":"3.0",
    "operation":{
        "operator": "concatenate",
        "operand": 001 }
    }
```

The resulting SELECT statement performs the specified operation indicated in the job description (e.g., concatenation) on the specified column in the distributed dataset.

Reject flows may be incorporated and processed at step 420 for saving rejected records. An additional status column is added that indicates a status (e.g., keep or reject) of a particular row. An intermediate distributed dataset maintains all rows expanded with this additional status column. In this case, a main flow and the reject flow may span in different directions. For example, a filter stage of a main flow may generate the correct distributed dataset with all kept rows, while another filter stage may generate the rejected distributed dataset with all the rejected rows. The job flows share the intermediate distributed dataset as the source dataset, where the intermediate distributed dataset is only collected once.

One or more transformation functions may be tagged and processed as a checkpoint (e.g., for failure re-start) or as persistent (e.g., for sharing computations) at step 425. Sampling and/or statistics may be utilized to identify frequent occurrences of intermediate data re-use. Checkpoints are inserted at the identified places to save intermediate distributed datasets at the checkpoints in database tables to be used when a job re-starts. Only the last completed distributed datasets in each execution path need to be saved. When the failed job re-starts, the job checks for the presence of previously saved distributed datasets in the database that represent the completed computations before the prior job execution failure. If these distributed datasets exist, the re-started job execution invokes a function (e.g., 'RestoreRDD( )') that re-creates each saved distributed dataset and continues remaining job execution.

When a transformation function is tagged as a checkpoint, the target distributed dataset (e.g., SPARK Resilient Distributed Dataset (RDD)) of the stage is persisted and written to a persistent storage (e.g., a temporary table on a database server, etc.). In the case of an execution failure, job flows can be re-started from the saved data (e.g., through a restoreRDD( ) function). For example, a job flow may be expressed as:

write(f1(f2(f3(read(DataSource)))),DataTarget), where f2 is tagged as a checkpoint. In case of job execution failure that happened while executing f1, the re-start job flow may be expressed as write(f1(restoreRDD(f2))) to re-start the job with the saved data from the point of the failure.

When a transformation function is tagged as persistent, the target distributed dataset (e.g., SPARK Resilient Distributed Dataset) of the stage is persisted in memory (e.g., and disk when no sufficient memory is available). When the read(DataSource) function is tagged as persistent, the example job flows write(copy(read(DataSource)), DataTarget1), write(copy(read(DataSource)), DataTarget2), and write(copy(read(DataSource)), DataTarget3) may be optimized into the following flows:

1) write(copy(read(DataSource)), DataTarget1), 2) write(copy(persistedRDD(<read-DataASource>)))), DataTarget2), and 3) write(copy(persistedRDD(<read-DataASource>))), DataTarget3), where <read-DataASource> is a handle to the saved distributed dataset. In the optimized flow, the read function is only executed once, and the read data is persisted in memory (and disk when no sufficient memory is available). The read function is not executed for the second and third flows since the data is already available in memory.

Figure 5A:
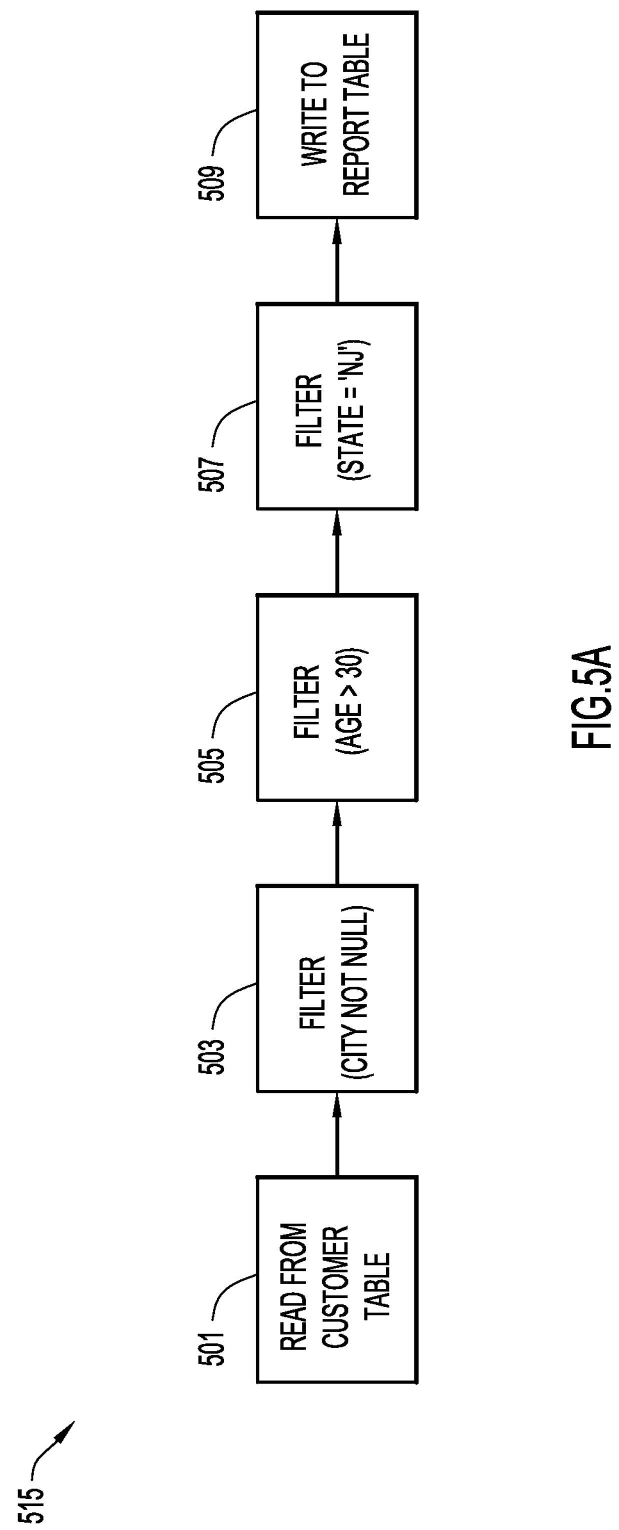
FIG. 5A is a diagrammatic illustration of an example job flow employing filters.

An example job flow with a series of filter operations is illustrated in FIG. 5A. In particular, job flow 515 includes a read operation 501, filter operations 503, 505, 507, and a write operation 509. Read operation 501 reads data from an example customer table. Filter operation 503 filters data by retrieving data where a city field is not null. Filter operation 505 further filters the data by retrieving data from the output of filter 503 where an age field is greater than 30. In addition, filter operation 507 further filters the data by retrieving data from the output of filter 505 where a state field equals the string 'NJ' (e.g., a state of New Jersey), thereby producing customers from New Jersey with a non-null city and an age greater than 30. Write operation 509 writes the resulting data to an example report table.

Figure 5B:
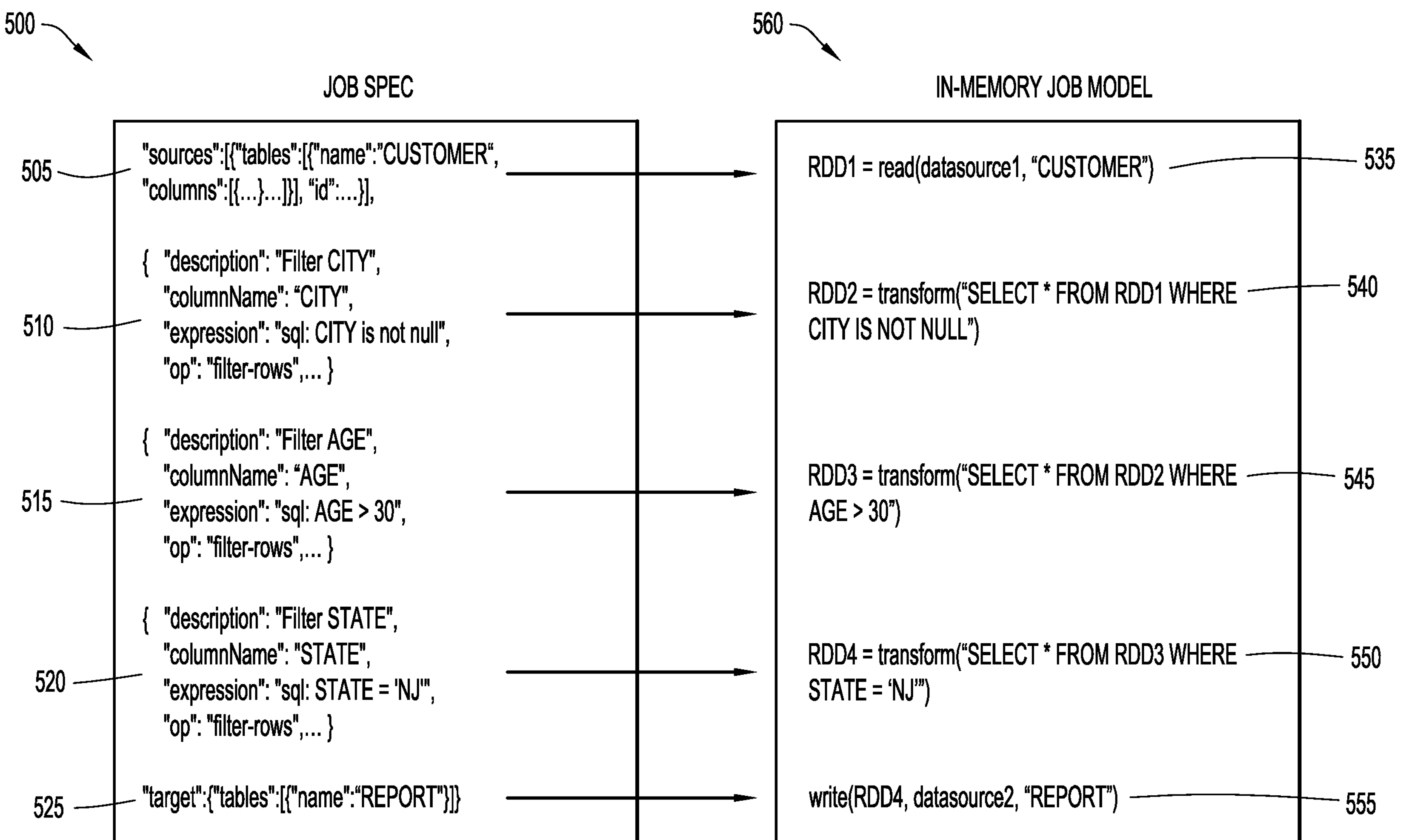
FIG. 5B is a diagrammatic illustration of transforming the job flow representation of FIG. 5A to an in-memory job model according to an embodiment of the present invention.

A job specification 500 (e.g., a JAVA Script Object Notation (JSON)) for job flow 515 and a resulting in-memory job model 550 are illustrated in FIG. 5B. In particular, job specification 500 includes statements 505, 510, 515, 520, 525 corresponding to each of the operations 501, 509 and filter operations 503, 505, 507 of job flow 515. For example, statement 505 specifies the source tables from which to retrieve data and corresponds to read operation 501. Statement 510 specifies a filter for a non-null city and corresponds to filter 503, while statement 515 specifies a filter for an age field greater than 30 and corresponds to filter 505. Statement 520 specifies a filter for a city field containing a string of 'NJ' and corresponds to filter 507. Statement 525 specifies the target tables in which to store the resulting data and corresponds to write operation 509.

The statements of job specification 500 are parsed and analyzed by flow module 160 (as described above for FIG. 4) to produce an in-memory job model or module 560 that includes a series of instructions 535, 540, 545, 550, 555 (e.g., SQL statements as described above) for execution by cluster 140 and corresponding to the statements of job specification 500 (and job flow 515). For example, instruction 535 reads data into a first distributed dataset (e.g., RDD1) from the customer table and corresponds to statement 505 (and read operation 501) Instruction 540 includes a SELECT statement generated from statement 510 to filter the data from the first distributed dataset (e.g., RDD1) where the city field is not null, and places the result in a second distributed data set (e.g., RDD2) (corresponding to statement 510 and filter operation 503). Instruction 545 includes a SELECT statement generated from statement 515 to filter the data from the second distributed dataset (e.g., RDD2) where the age field is greater than 30, and places the result in a third distributed data set (e.g., RDD3) (corresponding to statement 515 and filter operation 505). Instruction 550 includes a SELECT statement generated from statement 520 to filter the data from the third distributed dataset (e.g., RDD3) where the state field contains the string 'NJ', and places the result in a fourth distributed data set (e.g., RDD4) (e.g., corresponding to statement 520 and filter operation 507). Instruction 555 writes data from the fourth distributed dataset (e.g., RDD4) to the report table and corresponds to statement 525 (and write operation 509). Thus, the resulting in-memory module 560 utilizes the parallel processing and in-memory operations of cluster 140 to perform the job represented by job flow 515 for enhanced execution time and performance.

The resulting in-memory job model or module may be optimized to gain further performance enhancements. Initially, a stage transformation function processes input data by applying computational logic to each data row in the input data. A data row is an element of one of the input data sets. The computational logic may be applied once per row, to multiple rows at a time, or to the entire collection of rows at once. With respect to job optimization, a transformation function may be characterized based on input data dependency and data transformation scope.

For example and with respect to data dependency, a stage transformation function may filter out rows whose salary column exceeds 550,000. Accordingly, job optimizations should not change a job flow in a manner that could potentially impact the salary column of the input rows of the stage, thereby producing incorrect output data. By way of further example, a stage transformation function may concatenate strings in two columns into a new string column. In this case, the stage transformation function depends on values in the two original columns in the input data which should not be impacted. Another example includes a transformation function removing rows with duplicate values in a particular column by keeping the first row only. In this case, the order of the rows with respect to a certain value in the underlying column needs to be preserved in order to produce the same result. Therefore, this particular stage transformation function depends on the order of the rows with respect to the named column.

With respect to data transformation scope, the result of applying the transformation function of a stage to the input data may produce output data that differs from the input data in different ways. For example, a remove column transformation function removes one or more specified columns from the input data. The transformation scope only affects the removed columns. In contrast, the salary filter transformation example described above affects all columns of the rows that are excluded.

A job optimization may alter the order of two or more transformation functions in a job flow expression, combine multiple transformation functions into another, remove certain transformation functions, or add new transformation functions. However, the job optimization observes the input data dependencies of each affected transformation function, while the data transformation scope of the preceding transformation functions are used to determine whether input data dependencies are maintained.

The dependency and scope characteristics are coarse granular and do not take into account specific situations that are legitimate exceptions to the rules. For example, even though a converting lower case strings to upper case transformation function may affect all the values in the particular column, this transformation function does not affect the outcome of a comparing column with a string value ignoring case transformation function on the same column. User-defined exceptions are introduced to provide a fine granular control over the data dependency. Each user-defined exception is associated with a unique identification, and one or more column names that are to be excluded. A user-defined characteristic can be assigned as a dependency exception or a scope exception to a stage transformation function. When checking the input data dependencies of a transformation function against some data transformation scopes, if the same user-defined exception (identified by its unique identification) is included in both sides of the dependency, all the columns specified in the exception are excluded from the dependency check.

In order to perform optimization, all shaping or transformation operations are analyzed to determine which operations may be pushed into corresponding source connectors. For example, a job flow may include a sequence of operations from source to target.

[Source]→Op1→Op2→Op3→[Target]

Operations (e.g., Op1–OpN) may be pushed into the source (e.g., [Source]) if a corresponding modified source connector produces the same result as the final operation (e.g., OpN). In the case of shared source connectors (e.g., a source providing data to plural targets):

[Source1]→Op11→Op12→Op13→[Target1]

[Source1]→Op21→Op22→Op23→[Target2], the operations (e.g., Op11–Op1N, Op21–Op2N) may be pushed into the source (e.g., [Source]) if the corresponding modified connector ([Source1]) produces the same result as the final operations in both of the operation sequences (e.g., Op1N and Op2N) (e.g., Op11 and Op21 ( . . . Op1N and Op2N) are SQL-equivalent). In the case of join operations, a child dataset is created from a source connector, and the operations are only pushed into the main source connector.

For example:

```
"operations" : [
    {
        "columnName": "FIRST_NAME",
        "description": "Title case first name",
        "expression": "sql:TITLECASE(FIRST_NAME)",
        "op": "text-transform",...
    },
    {
        "description": "Filter STATE",
        "columnName": "STATE",
        "expression": "sql:STATE = 'NJ'",
        "op": "filter-rows",...
    },
```

-continued

```
    {
        "description": "Filter LAST_NAME",
        "columnName": "LAST_NAME",
        "expression": "sql:LAST_NAME = 'Smith'",
        "op": "filter-rows",...
    }]
```

The above example filter operations may be pushed into the source connector.

By way of further example, a job flow may be expressed as {Source, op1, op2, op3, . . . , opN, target}. Some operations can be modeled as a sub-query, and be combined into a single cluster (e.g., SPARK) Structured Query Language (SQL) statement. For example, a job (of the above format {Source, op1, op2, op3, . . . , opN, target}) may be expressed as the following:

```
{Read_From_DB, Filter_by_state='NJ',
Filter_by_city='AltanticCity', Filter_by_Industry='Entertainment',
StandardizeAddress, Mask_Employer_IdentificationNumber,
Write_to_Analytics}
```

In this example case, the read operation (e.g., Read_From_DB) can be transformed into a distributed dataset (e.g., SPARK Resilient Distributed Dataset (RDD)) read. The filtering operations may be transformed into separate WHERE clauses, or a combined WHERE clause using an AND operation. Since the StandardizeAddress operation takes one column and decomposes that column into plural standardized columns, this causes the flow to stop since no more operations can be combined. The Mask_Employer_IdentificationNumber operation may be a simple distributed dataset (e.g., SPARK RDD) transformation. The Write_to_Analytics operation writes a complete distributed dataset (e.g., SPARK RDD) to the target database.

Figure 6A:
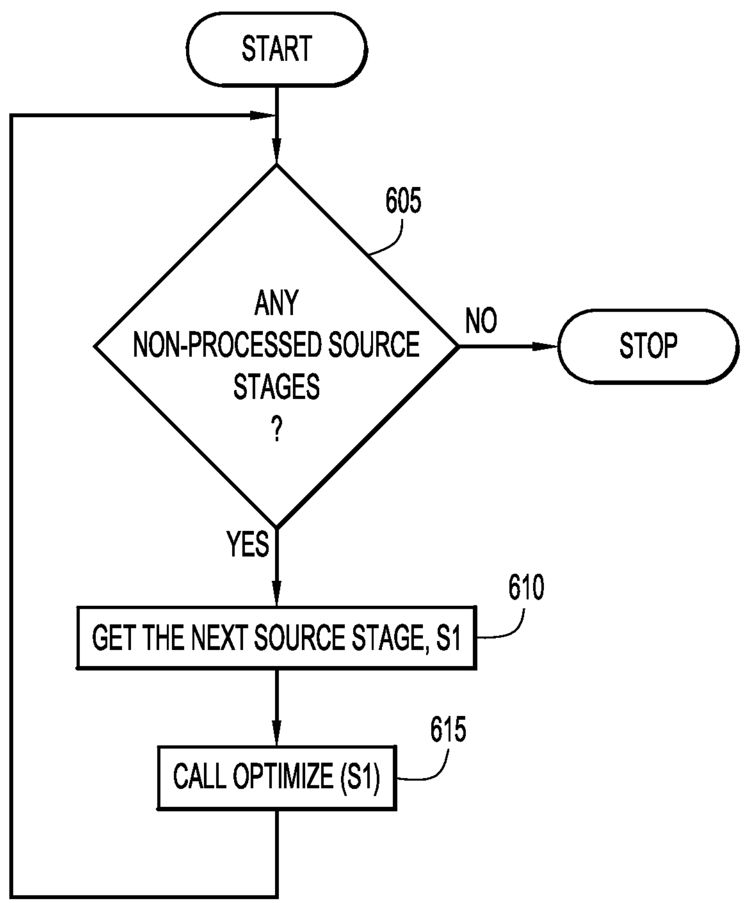
FIGS. 6A and 6B are a procedural flowchart illustrating a manner of optimizing an in-memory job model according to an embodiment of the present invention.
Figure 6B:
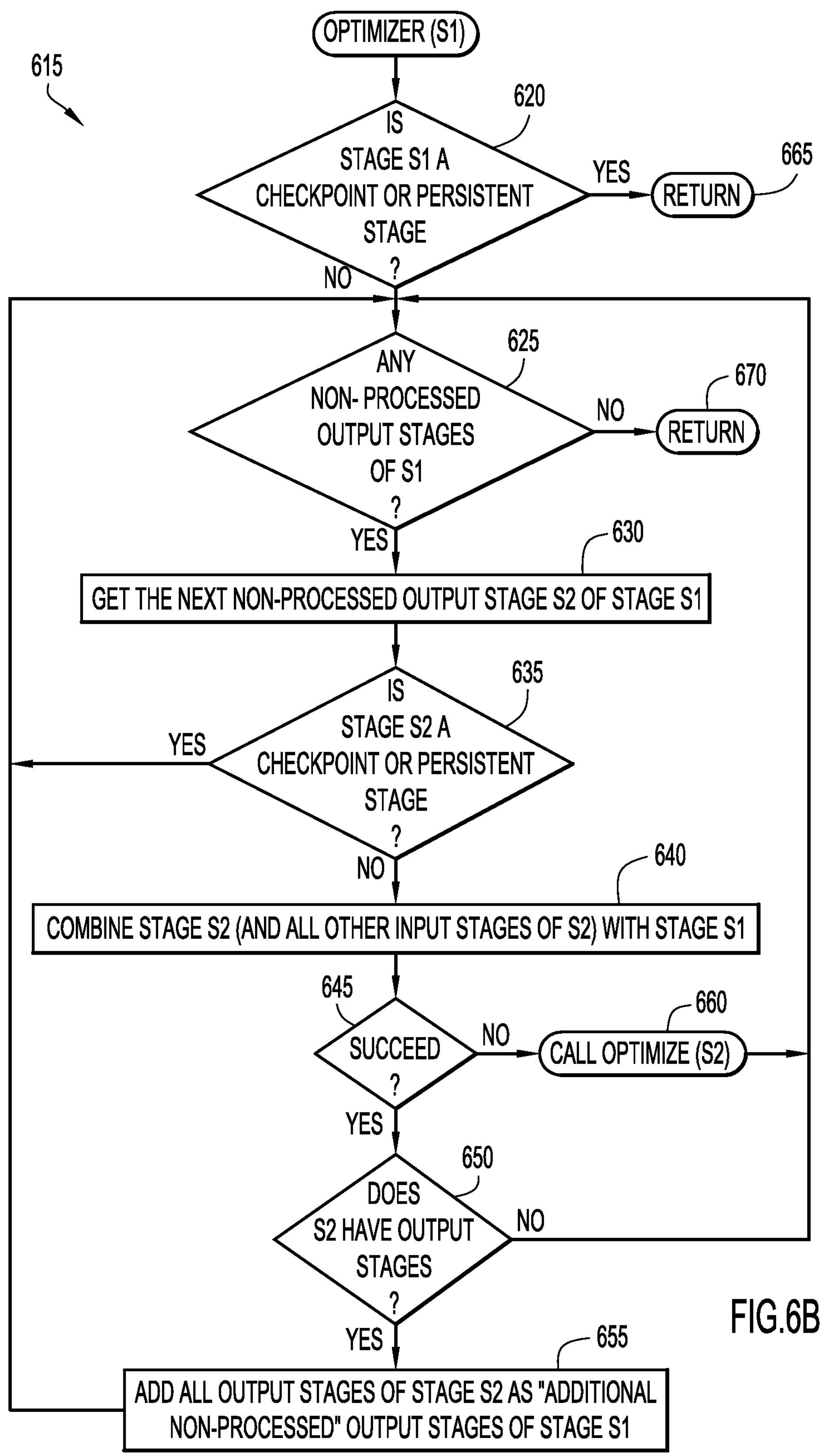

A manner of optimizing an in-memory job model or module (e.g. via server system 110 and flow module 160) according to an embodiment of the present invention is illustrated in FIGS. 6A and 6B. Initially, the output stages of a source stage, S1, contain every stage, S2, that is at the other end of a link originating from stage S1. Referring by way of example to FIG. 3, copy stage 305 is an output stage of source stage 300 (TABLE1), while the copy stage has output stages 310 (TABLE2), 315 (TABLE3), and 320 (TABLE4). The set of input stages for a given stage includes every stage for which the given stage is an output stage.

The optimization of present invention embodiments (e.g., by job optimizer 166) combines (e.g., pushes down) a set of stages into a given single stage. If the optimization succeeds, all the stages in the set are combined with the given stage, and no longer exist in the job model. This is accomplished by combining the (generated SQL) statements of the in-memory job model to produce an optimized model.

Specifically, each source stage is processed in order to traverse the in-memory job model. When a non-processed source stage exists in the in-memory job model as determined at step 605 (FIG. 6A), the non-processed source stage, S1, is retrieved at step 610. The retrieved source stage, S1, is optimized by an optimize process at step 615 (FIG. 6B) (e.g., Optimize(stage) as viewed in FIGS. 6A and 6B, where the stage argument is the stage to be optimized). The process terminates when all of the source stages of the in-memory job model have been processed as determined at step 605.

In order to optimize a source stage, each output stage of the source stage is processed by the optimize process in order to traverse the in-memory job model. The source and output stages represent the data connection (or linking) between the instructions in the in-memory job model. For example, a distributed data set (e.g., RDD) in the in-memory job model may be produced by an initial instruction, and utilized by a plurality of subsequent instructions. The initial instruction generating the distributed dataset may correspond to a source stage, and the plurality of instructions utilizing the distributed dataset may correspond to output stages.

Referring to FIG. 6B, the optimize process (e.g., step 615) receives a source stage, S1, to process as described above. If the source stage, S1, is tagged as a checkpoint or persistent (e.g., a checkpoint or persistent stage) as determined at step 620, the source stage is bypassed for optimization and the optimize process terminates at step 665. When the source stage, S1, is not a checkpoint or persistent stage, and a non-processed output stage, S2, exists for the source stage in the in-memory job model as determined at step 625, the non-processed output stage, S2, is retrieved at step 630.

If the output stage, S2, is tagged as a checkpoint or persistent (e.g., a checkpoint or persistent stage) as determined at step 635, the output stage, S2, is bypassed for optimization and the next output stage that has not been processed is retrieved at steps 625, 630 as described above. Once a non-processed output stage, S2, that is not a checkpoint or persistent stage has been retrieved, the output stage, S2, is combined with the source stage, S1, at step 640 (e.g., when the combining action has not been previously attempted). The combining action attempts to combine the output stage and every input stage of the output stage (except the source stage itself) with the source stage (e.g., combine instructions of the in-memory model). For example, the combining action checks if all the input stages of the output stage can be combined with the source stage. All input stages of the output stage can be combined with the source stage when the combined operation or stages generate exactly the same intermediate result as the original output stage.

Since it is not practical to validate the combined stage by running the combined stage and comparing the original job model with the modified job model, a systematic rule-based approach or mapping of operations may be utilized to determine an appropriate combination. The rules or mapping may specify the manner in which operations may be combined (e.g., generation of SQL expressions). For example, filter operations or stages may be combined with database and shaping operations as follows, where similar rules or mappings may be produced for other combinations and combining other operations. The optimize notation (e.g., optimize(argument 1, argument2)) indicates that the specified arguments are to be combined:

optimize(Filter, DB)—the SQL expression in Filter gets translated into a SQL expression that can be logically "AND"ed with an existing expression in the WHERE clause to combine a filter and database operations;

optimize(Filter1, Filter2)—the SQL expression in Filter1 gets logically "AND"ed with the SQL expression in Filter2 to combine the filter operations;

optimize(Filter1, RemoveColumn)—the SQL expression in Filter1 can be safely combined with a RemoveColumn stage without changing the filter expression. The removed column is removed from the select list in the generated SQL for the combined stage;

optimize(Filter1, RenameColumn)—the SQL expression in Filter1 can be safely combined with a RenameColumn stage without changing the filter expression. The new column name appears in the select list in the generated SQL for the combined stage;

optimize(Filter SuppressBlanks)—the SQL expression in Filter1 can be safely combined with a SuppressBlanks stage by logically "AND"ing the filter SQL expression with the SQL expression for suppressing blanks;

optimize(Filter1, SuppressNulls)—the SQL expression in Filter1 can be safely combined with a SuppressNulls stage by logically "AND"ing the filter SQL expression with the SQL expression for suppressing nulls;

optimize(Filter1, Join)—the SQL expression in Filter1 can be safely combined with a Join stage by logically "AND"ing the filter SQL expression with the join expression;

optimize(Filter1, Lookup)—the SQL expression in Filter1 can be safely combined with a Lookup stage by logically "AND"ing the filter SQL expression with the join expression;

optimize(Filter1, Transform)—the SQL expression in Filter1 can be safely combined with a Transform stage by adding a WHERE clause for the filter SQL expression;

optimize(Filter1, CalculateColumnValue)—the SQL expression in Filter1 can be safely combined with a CalculateColumnValue stage by adding a WHERE clause for the filter SQL expression;

optimize(Filter1, ColumnMetric)—the SQL expression in Filter1 can be safely combined with a ColumnMetric stage by adding a WHERE clause for the filter SQL expression;

optimize(Filter1, Sort)—the SQL expression in Filter1 can be safely combined with a Sort stage by adding a WHERE clause for the filter SQL expression; and optimize(Filter1, Standardize)—the SQL expression in Filter1 can be safely combined with a Standardize stage by adding a WHERE clause for the filter SQL expression.

If the combining action succeeded as determined at step 645 (e.g., based on application of the mappings or rules), all input stages of the output stage (except the source stage) have been combined with the source stage, and no longer exist in the job model. When the output stage, S2, contains output stages as determined at step 650, the output stages of the output stage, S2, are set as additional non-processed output stages of the source stage, S1, at step 655. When the output stage does not contain output stages as determined at step 650, or the additional output stages from output stage, S2, have been set as output stages for source stage, S1, at step 655, the above process is repeated for subsequent non-processed output stages of the source stage, S1. The process terminates for the source stage at step 670 when all of the output stages for the source stage have been processed as determined at step 625.

If the combining action failed as determined at step 645, the output stage, S2, remains an output stage of the source stage, S1. In this case, the output stage, S2, is set as the new source stage, and this optimize process (e.g., step 615) is repeated at step 660 with output stage, S2, as the new source stage. Once the optimize process for the new source stage is completed, the optimize process resumes for original source stage, S1, and is repeated for subsequent non-processed output stages of the source stage, S1 (e.g. from step 625). The process terminates for the source stage, S1, at step 670 when all of the output stages for the source stage have been processed as determined at step 625. Thus, the in-memory job model is optimized in a recursive fashion to process and combine stages (or instructions) within the job model.

Figure 7:
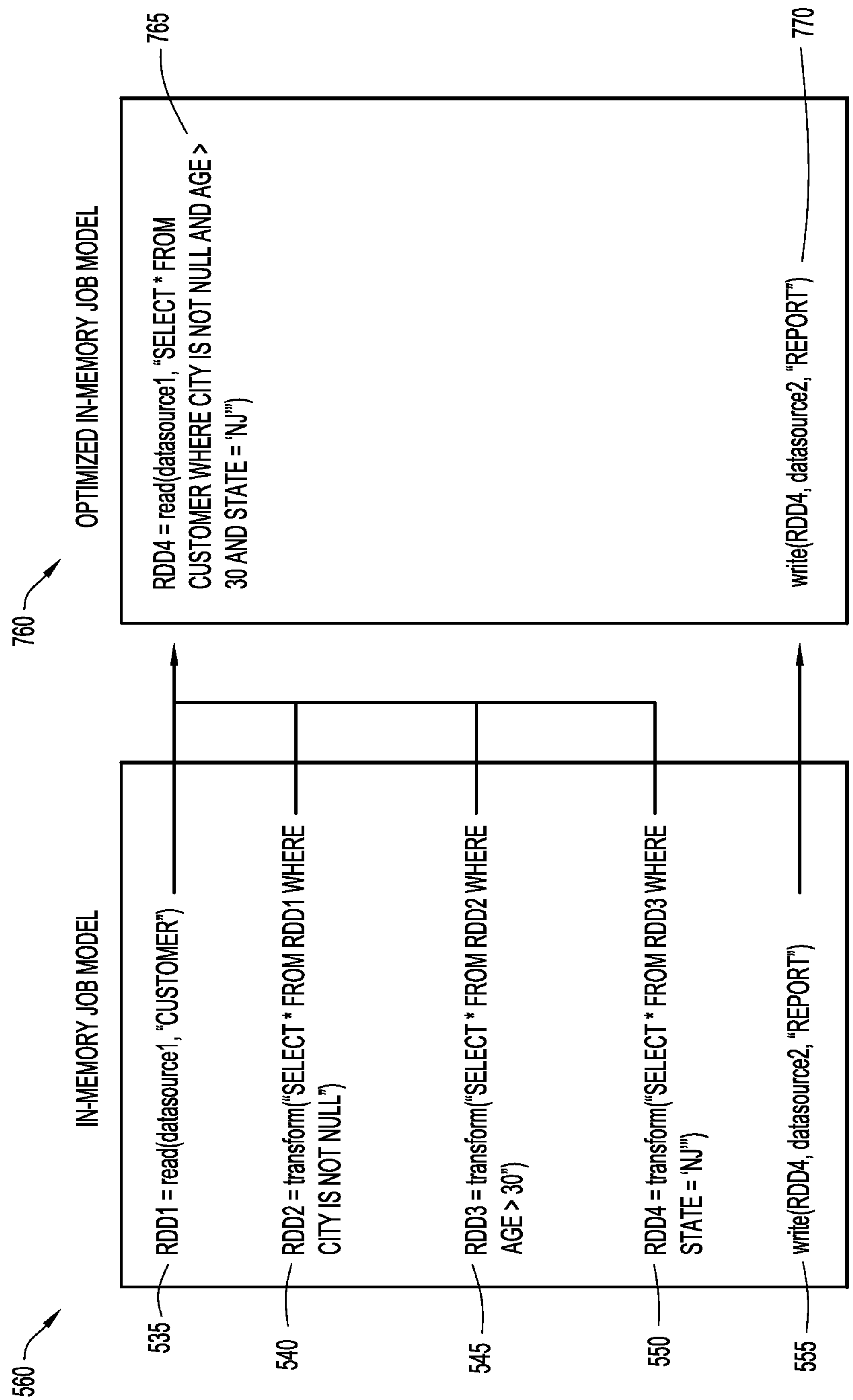
FIG. 7 is a diagrammatic illustration of optimizing an in-memory job model according to an embodiment of the present invention.

An example of an optimized in-memory job model module is illustrated in FIG. 7. Initially, in-memory job model 560 has been produced from job flow 515 and includes instructions 535, 540, 545, 550, and 555, each as described above. Read instruction 535 and filter instructions 540, 545, 550 may be combined as represented by the combined instruction 765 of optimized in-memory job model or module 760. Instruction 765 reads data from the customer table, and applies each of the filters (e.g., city field is not null, age field greater than 30, and state field containing the string 'NJ') to the read data. The resulting filtered data is stored in the fourth distributed dataset (e.g., RDD4). Instruction 770 of the optimized in-memory job model or module 760 stores the resulting data in the report table. Thus, the optimized in-memory job model or module provides reduced instructions for increased processing performance (e.g., reduced execution time).

The optimized module typically contains a smaller set of stages (or instructions) since some of the stages get combined with the source stages. Prior to execution of the optimized module, a Structured Query Language (SQL) statement is generated for each stage of the optimized module, and a runtime SQLNode object and corresponding surrogate SQLTask object are generated that wraps up each stage. The result of these actions (e.g., by job optimizer 166) produces a distributed dataset object graph which is executed by cluster 140. In other words, a distributed dataset (e.g., SPARK Resilient Distributed Dataset (RDD)) object graph is constructed on top of those SQL statements. The distributed dataset object graph is executed to perform the SQL transformation.

The runtime execution task for each stage is performed by a computing node of the cluster, or more specifically by a corresponding SQLTask of the SQLNode of a computing node. For example, a flow to transform and filter data from an employee table to a CSV file may be expressed as:

[DB2'Employee'table]→[text-transform op]→[filter-rows op]→[filter-rows op]→[CSV file'localSelection.txt']

The following SQL statements are created for each corresponding stage in the flow (where wrappers (from connectivity wrappers 230) (e.g., SQLWrapperNode, SQLQueryNode, SQLWriteNode) provide an interface to cluster 140 (e.g., SPARK computing environment) between SQL and distributed dataset operations to perform the specified SQL operations on the distributed datasets):

```
[DB2 'Employee' table] ->
[SQLWrapperNode(ConvertSQLNode(RDDFactory.createRowRDD( )))]
[text-transform op] -> [SQLQueryNode(SQLTextTransformTask)]
[filter-rows op] -> [SQLQueryNode(SQLFilterRowsTask)]
[filter-rows op] -> [SQLQueryNode(SQLFilterRowsTask)]
[CSV file 'localSelection.txt'] ->
[SQLWriteNode(CSVSchemaRDDWriter.write( ))],
```

where the read operation generates and stores data in a distributed data set, the filter and transform operations perform the corresponding operations on the data within the distributed dataset within the cluster computing nodes, and the write operation stores the resulting data from the distributed dataset to the file. Stage synchronizers orchestrate flow executions on top of the distributed datasets (e.g., SPARK Resilient Distributed Datasets (RDD)).

Figure 8:
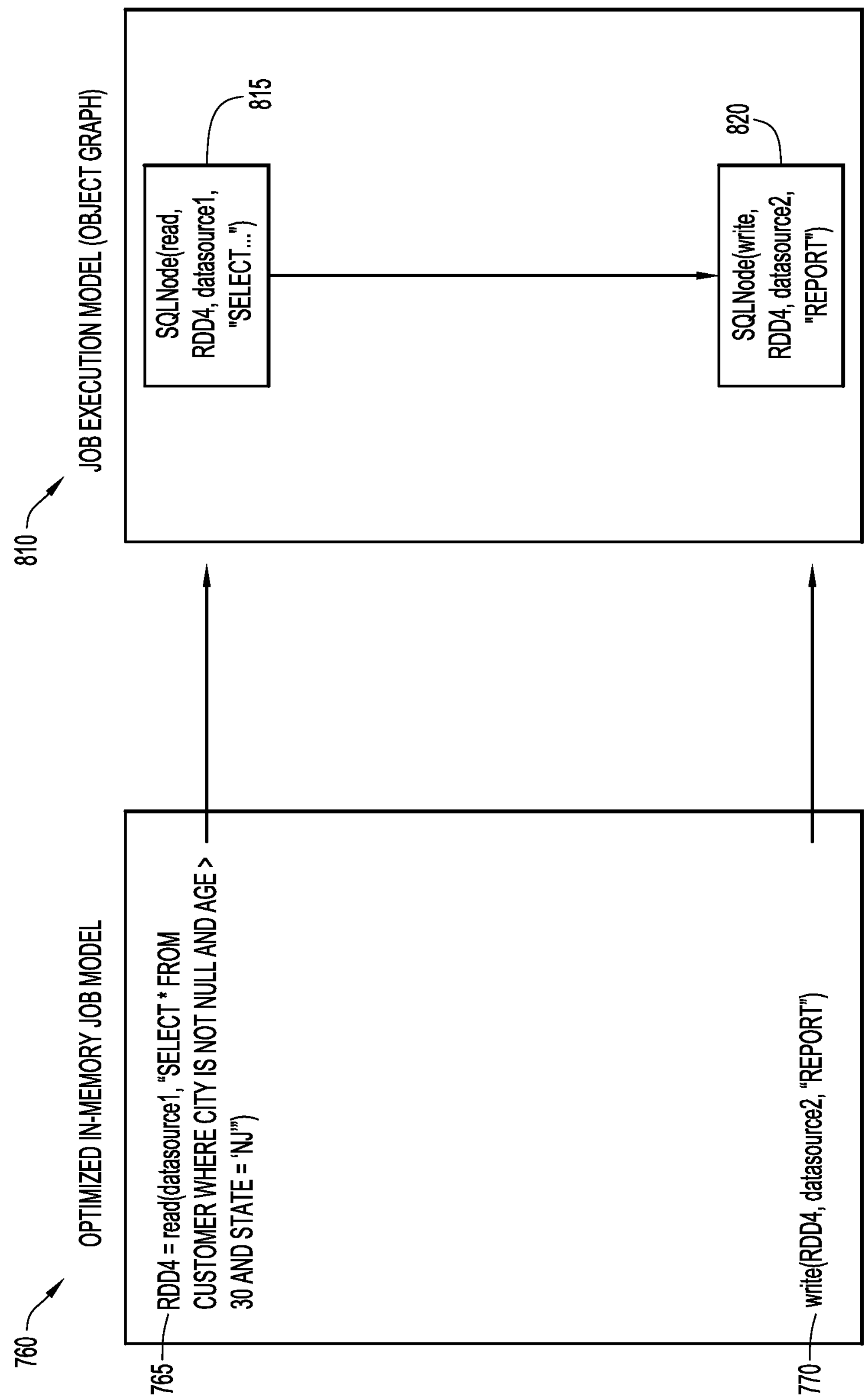
FIG. 8 is a diagrammatic illustration of transforming the optimized job model of FIG. 7 to an in-memory job execution model according to an embodiment of the present invention.

An example of an execution job model is illustrated in FIG. 8. Initially, optimized job model 760 has been produced from in-memory job model 560 (FIG. 7) and includes instructions 765, 770, each as described above. Instruction 765 reads data from the customer table and applies each of the filters (e.g., city field is not null, age field greater than 30, and state field containing the string 'NJ') to the read data. Instruction 770 stores the resulting data in the report table. A Structured Query Language (SQL) statement 815 is generated for instruction 765 on top of a distributed data set (e.g., RDD4) node (of job execution module or object graph 810). Similarly, a SQL statement 820 is generated for instruction 770 on top of another distributed data set (e.g., RDD4) node (of job execution module or object graph 810). The resulting nodes produce job execution module or object graph 810 that may be submitted to cluster 140 for execution.

It will be appreciated that the embodiments described above and illustrated in the drawings represent only a few of the many ways of implementing embodiments for transforming and loading data utilizing in-memory processing.

The environment of the present invention embodiments may include any number of computer or other processing systems (e.g., client or end-user systems, server systems, computing nodes, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, flow module, etc.). These systems may include any types of monitors and input devices (e.g., keyboard, mouse, voice recognition, etc.) to enter and/or view information.

It is to be understood that the software (e.g., flow module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, cluster, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., flow module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user defined functions, libraries, connectivity wrappers, job specifications, in-memory job models, execution models, optimized models, cluster information, etc.). The database system may be implemented by any number of any conventional or other databases, data stores or storage structures (e.g., files, databases, data structures, data or other repositories, etc.) to store information. The database system may be included within or coupled to the server systems, client systems, and/or cluster. The database systems and/or storage structures may be remote from or local to the computer or other processing systems, and may store any desired data.

The present invention embodiments may employ any number of any type of user interface (e g. Graphical User Interface (GUI), command-line, prompt, etc.) for obtaining or providing information (e.g., job specification, in-memory model, execution model, optimized model, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized to produce in-memory models for execution for any types of jobs. The jobs may be specified in any desired notation, format, and/or language. The models may include any types of operational or other statements based on any types of rules and/or mappings. Any suitable optimization techniques (e.g., consolidation, pushing to sources, re-arrangement, etc.) may be utilized to optimize the in-memory model. The checkpoints may be placed at any desired locations based on any suitable criteria (e.g., manually placed, statistics or metrics, etc.). The reject flow may be used to maintain or remove any desired data based on any criteria or conditions.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises”, “comprising”, “includes”, “including”, “has”, “have”, “having”, “with” and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for processing an Extract, Transform, Load (ETL) job comprising:

at least one processor configured to:

analyze a specification of the ETL job including one or more functional expressions to load data from one or more source data stores, process the data in memory, and store the processed data to one or more target data stores;

produce one or more data flows from the specification based on the one or more functional expressions, wherein the one or more data flows utilize in-memory distributed data sets generated to accommodate parallel processing for loading and processing the data, wherein producing the one or more data flows comprises transforming the ETL job into an in-memory computational model comprising a plurality of query language statements by:

converting each source table identified in the ETL job into a read function executable on the in-memory distributed data sets, converting each target table identified in the ETL job into a write function executable on the in-memory distributed data sets, and converting each shaping or transformation operation identified in the ETL job into an operational statement executable on the in-memory distributed data sets;

optimize the one or more data flows to assign transformation operations to be performed on the one or more source data stores, wherein optimizing the one or more data flows comprises consolidating two or more query language statements of the plurality of query language statements; and transmit the in-memory computational model to a cluster comprising a plurality of nodes to execute, in parallel by the plurality of nodes, the optimized data flows to load the data to the one or more target data stores in accordance with the specification.

2. The system of claim 1, wherein the at least one processor is further configured to:

store results of one or more designated operations on an in-memory distributed data set of a data flow.

3. The system of claim 2, wherein the at least one processor is further configured to:

re-start the ETL job from a previously executed designated operation based on corresponding stored results.

4. The system of claim 2, wherein the at least one processor is further configured to:

re-use the stored results of a designated operation in response to a subsequent execution of that operation.

5. The system of claim 1, wherein the at least one processor is further configured to:

maintain a filtered status of data within an in-memory distributed data set to accommodate filtering conditions.

6. The system of claim 1, wherein executing the optimized data flows comprises:

generating query language constructs for functions of the optimized data flows;

generating a graph of objects of the in-memory distributed data sets corresponding to the query language constructs; and transforming the optimized data flows to the query language based on the generated graph.

7. The system of claim 1, wherein elements of an in-memory distributed data set are distributed across a plurality of computing nodes.

8. The system of claim 1, wherein the transformation operations are performed prior to extracting the data to the one or more target data stores, and wherein the transformation operations are performed on the data that is loaded into the in-memory resilient distributed data sets.

9. A computer program product for processing an Extract, Transform, Load (ETL) job, the computer program product comprising one or more computer readable storage media collectively having program instructions embodied therewith, the program instructions executable by a processor to cause the processor to:

analyze a specification of the ETL job including one or more functional expressions to load data from one or more source data stores, process the data in memory, and store the processed data to one or more target data stores;

produce one or more data flows from the specification based on the one or more functional expressions, wherein the one or more data flows utilize in-memory distributed data sets generated to accommodate parallel processing for loading and processing the data, wherein producing the one or more data flows comprises transforming the ETL job into an in-memory computational model comprising a plurality of query language statements by:

converting each source table identified in the ETL job into a read function executable on the in-memory distributed data sets, converting each target table identified in the ETL job into a write function executable on the in-memory distributed data sets, and converting each shaping or transformation operation identified in the ETL job into an operational statement executable on the in-memory distributed data sets;

optimize the one or more data flows to assign transformation operations to be performed on the one or more source data stores, wherein optimizing the one or more data flows comprises consolidating two or more query language statements of the plurality of query language statements; and transmit the in-memory computational model to a cluster comprising a plurality of nodes to execute, in parallel by the plurality of nodes, the optimized data flows to load the data to the one or more target data stores in accordance with the specification.

10. The computer program product of claim 9, wherein the program instructions further cause the processor to:

store results of one or more designated operations on an in-memory distributed data set of a data flow.

11. The computer program product of claim 10, wherein the program instructions further cause the processor to:

re-start the ETL job from a previously executed designated operation based on corresponding stored results.

12. The computer program product of claim 10, wherein the program instructions further cause the processor to:

re-use the stored results of a designated operation in response to a subsequent execution of that operation.

13. The computer program product of claim 9, wherein the program instructions further cause the processor to:

maintain a filtered status of data within an in-memory distributed data set to accommodate filtering conditions.

14. The computer program product of claim 9, wherein executing the optimized data flows comprises:

generating query language constructs for functions of the optimized data flows;

generating a graph of objects of the in-memory distributed data sets corresponding to the query language constructs; and transforming the optimized data flows to the query language based on the generated graph.

15. The computer program product of claim 9, wherein elements of an in-memory distributed data set are distributed across a plurality of computing nodes.

16. The computer program product of claim 9, wherein the transformation operations are performed prior to extracting the data to the one or more target data stores, and wherein the transformation operations are performed on the data that is loaded into the in-memory resilient distributed data sets.

* * * * *